July 25, 1933.  W. T. DONALDSON  1,919,934
CONVEYER SYSTEM
Filed May 7, 1932  5 Sheets-Sheet 1
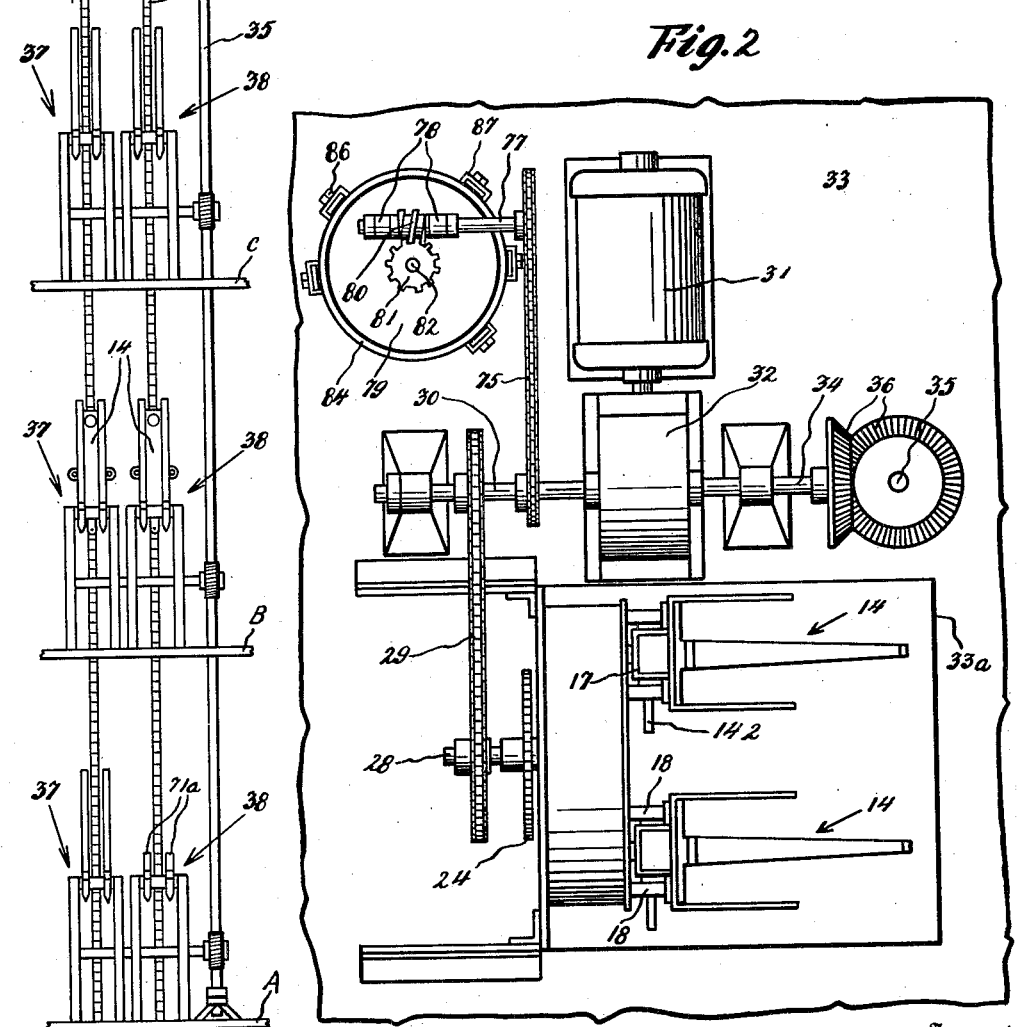
Inventor
William T. Donaldson
By Stryker & Stryker
Attorneys

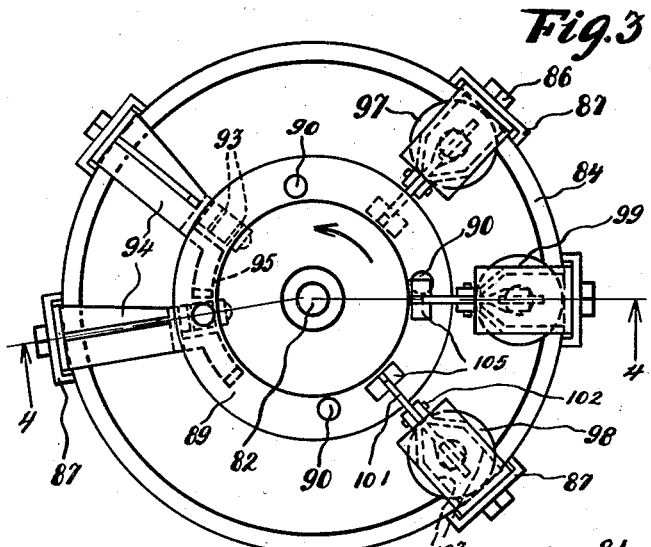
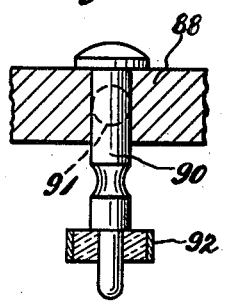
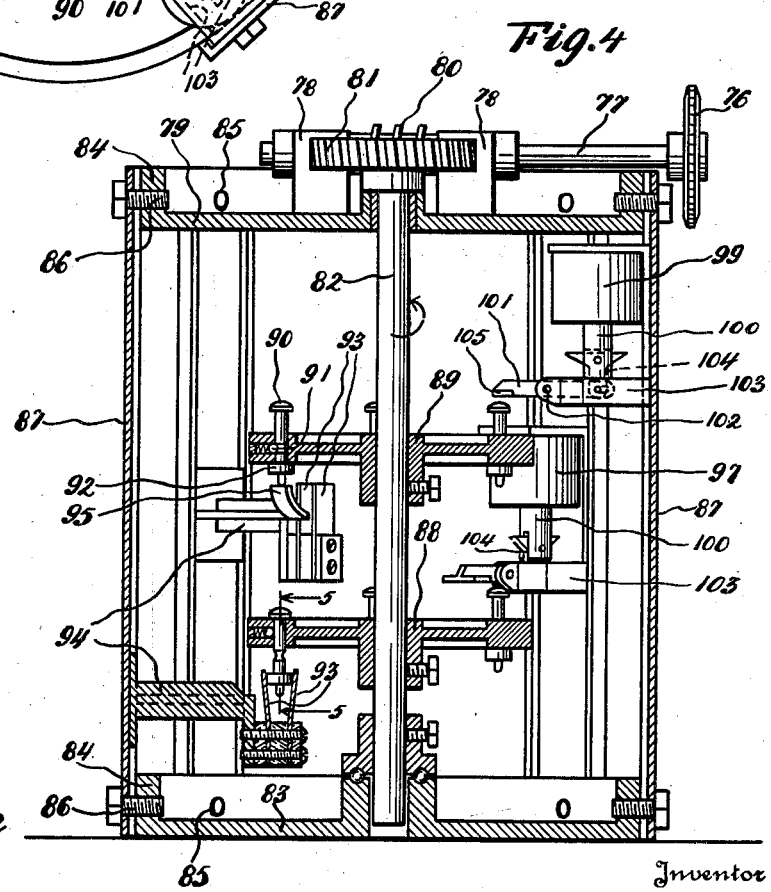

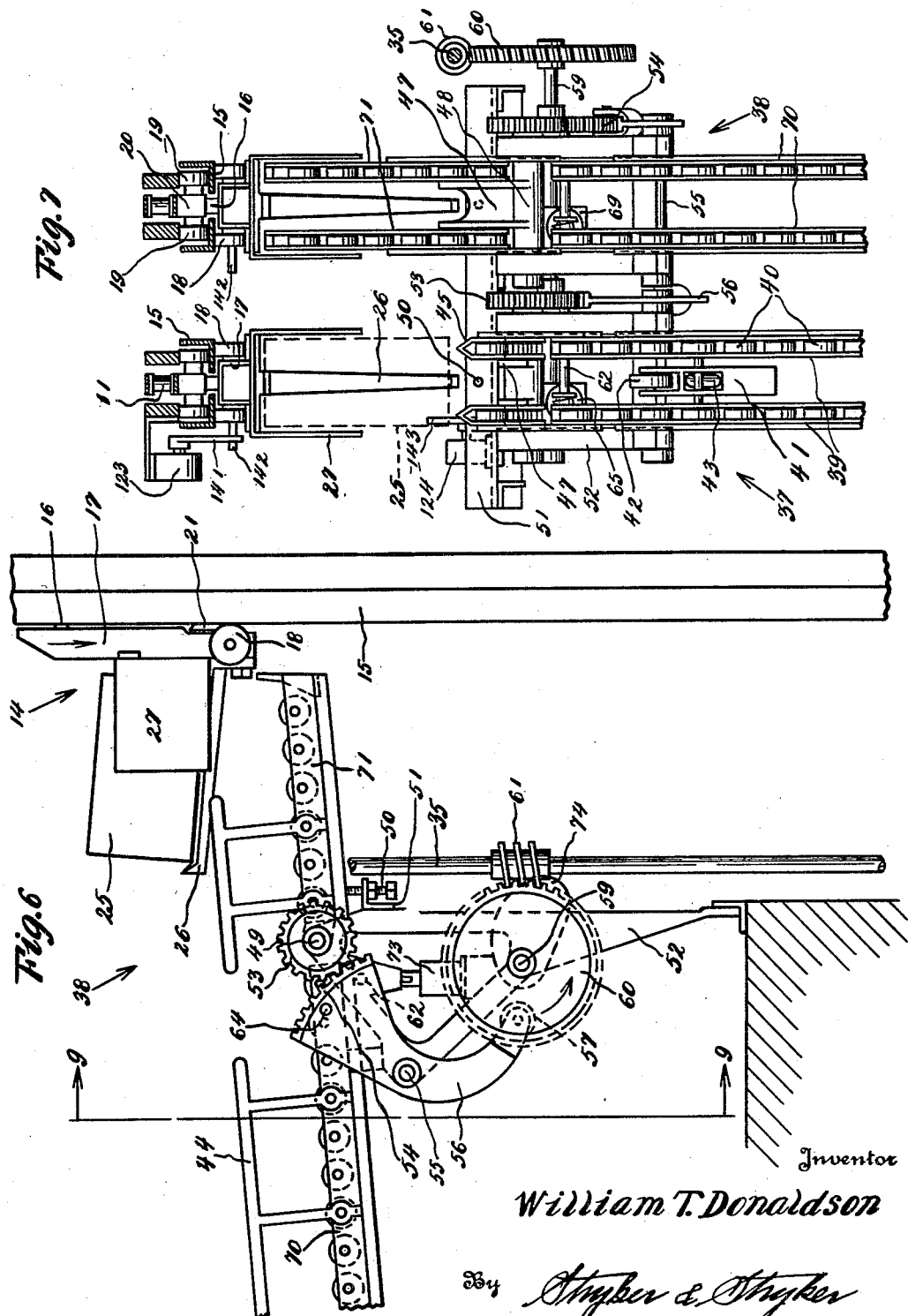

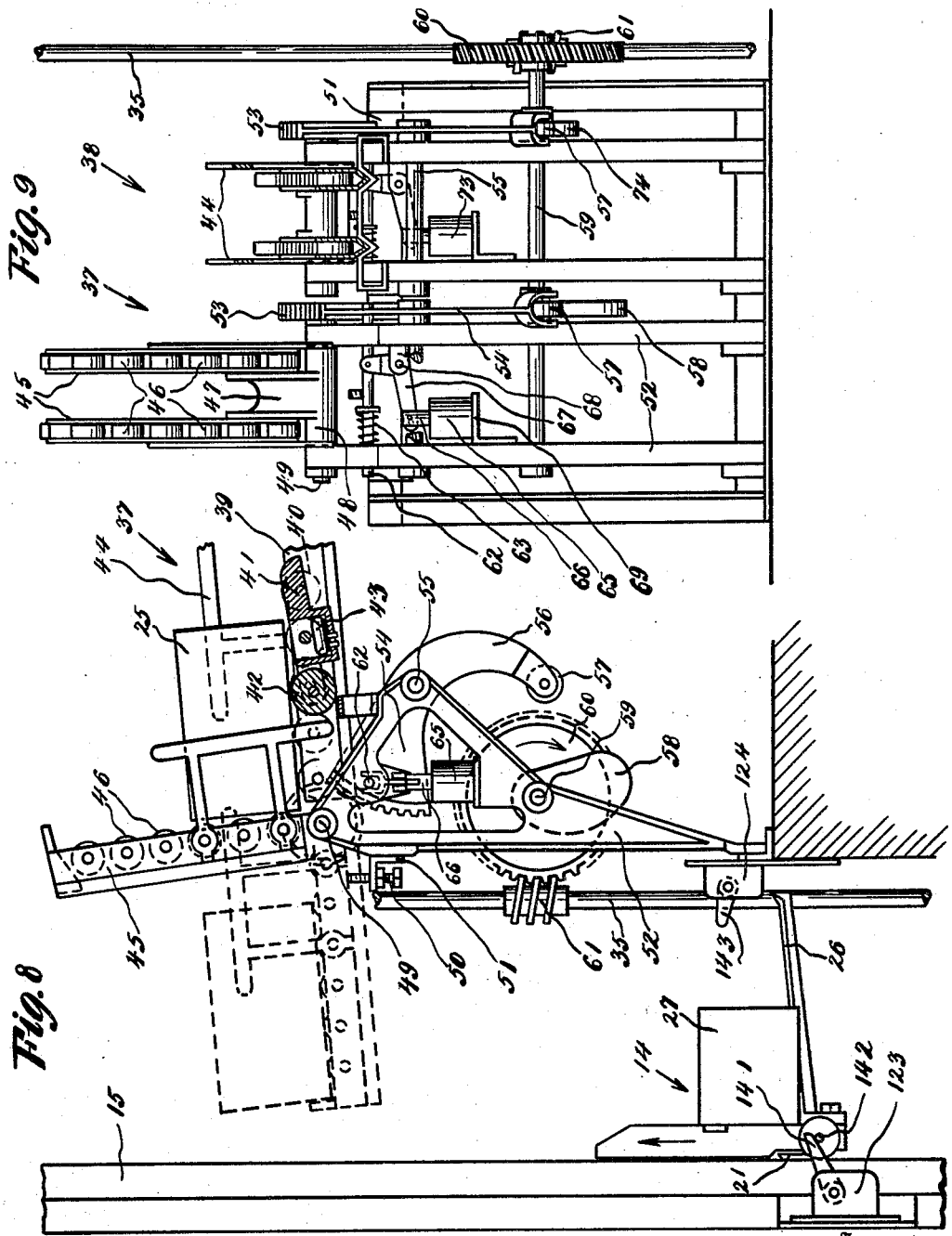

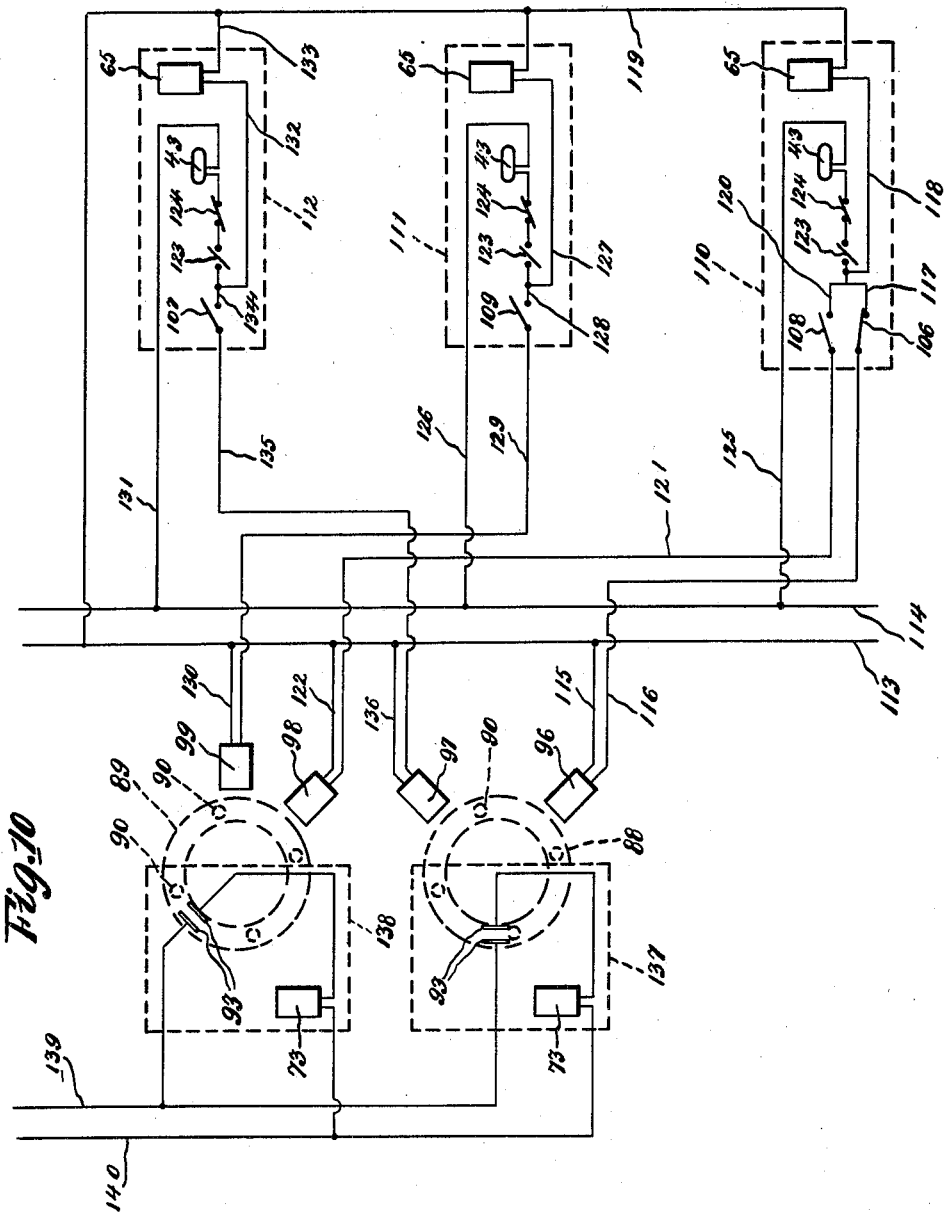

Patented July 25, 1933

1,919,934

UNITED STATES PATENT OFFICE

WILLIAM T. DONALDSON, OF WHITE BEAR, MINNESOTA, ASSIGNOR TO STANDARD CONVEYOR COMPANY, OF NORTH ST. PAUL, MINNESOTA, A CORPORATION OF MINNESOTA

CONVEYER SYSTEM

Application filed May 7, 1932. Serial No. 609,884.

This invention relates to a conveyer system having despatching and receiving stations and of the type wherein a load may be automatically delivered at any receiving station under control of electric switches located at the despatching station or stations.

It is my object to render such a system more uniformly certain in operation by a simplified and more efficient arrangement of timing and control mechanism.

A further object is to provide, in combination with a conveyer having a series of spaced carriers and receiving and despatching stations, a unitary, compact and readily adjustable timer which may be located at a point remote from the despatching and receiving stations but under control of switches located at the despatching stations for automatically delivering loads from the carriers to the several receiving stations.

The invention also includes certain other novel features of construction as hereinafter more fully set forth.

The invention will be best understood by reference to the accompanying drawings in which:

Figure 1 is a front elevation illustrating diagrammatically the principal mechanical features of a suitable conveyer system to which the invention is applied;

Fig. 2 is a plan view of the conveyer exclusive of the electric circuits;

Fig. 3 is a plan view of the timer with the drive gearing and top frame member removed;

Fig. 4 is a vertical section through the timer taken on the line 4—4 of Fig. 3;

Fig. 5 is a detail, central vertical section through one of the switch-actuating pins of the timer;

Fig. 6 is a side elevation of one of the receiving stations with the associated delivery mechanism, together with a portion of the main conveyer;

Fig. 7 is a plan view of a pair of receiving and despatching stations with the associated loading and delivery mechanism and drive therefor, and also showing the main conveyer in horizontal section;

Fig. 8 is a side elevation, partially in central, vertical section, showing a despatching station with the associated loading mechanism and a portion of the conveyer;

Fig. 9 is a section taken on the line 9—9 of Fig. 6; and

Fig. 10 is a typical wiring diagram for the embodiment of the invention illustrated.

*Conveyer and Carriers*

The conveyer and carriers illustrated herein are of the type described and claimed in the application of John Caesar and Smith Eggleston, Serial No. 482,484, filed September 17, 1930. It will be understood that this is only one form of conveyer to which the invention may be applied.

As best shown in Figs. 1, 2 and 7, the conveyer has an endless chain 11 trained on a sprocket wheel 12 at the upper extremity of an elevator shaft and on a similar sprocket wheel 13 at the lower end thereof. Secured at regularly spaced intervals to the chain 11, is a series of carriers indicated generally by the numeral 14. These carriers are guided along spaced parallel rails 15 between which a pin 16 passes to connect the upper end of a carrier member 17 to the chain 11. A pair of anti-friction wheels 18 are mounted on the carrier member 17 to run upon the front surfaces of the guides 15 and similar wheels 19 are mounted on opposite sides of a block 20 which is swiveled on the pin 16 and rigidly connected to the chain 11.

To maintain the carrier member 17 in upright position throughout its course of travel, a wheel 21 is mounted on the carrier with the axis of said wheel between the guides 15. This wheel 21 has an axis of rotation extending perpendicular to the front and back surfaces of the guides 15 and is arranged to be received in notches 22 formed in disks 23 disposed near the upper and lower ends of the conveyer beneath the sprocket wheels 12 and 13 respectively. By suitable gearing 24 (Fig. 2) the disk 23 is operatively connected to the adjacent sprocket wheel 12 so as to rotate in unison therewith and the disk near the sprocket wheel 13 is rotated from the latter by similar gearing. The notches 22 in the disks 23 are arranged to register with the openings between the guides 15 at the moment the wheel 21 on a carrier reaches the periphery of the disk and on further movement of the carrier and disk the latter engages the wheel 21 on the carrier and moves it in an arc corresponding to the arc described by the pivot pin 16 as it passes around the periphery of the sprocket wheel 13. To support a load, such as a box 25, on a carrier 14, the latter is provided with an arm 26 projecting therefrom and side walls 27 spaced laterally from the arm 26.

At the upper end of the conveyer, the sprocket wheel 12 is fixed on a horizontal shaft 28 which projects to the rear and is arranged to be driven by suitable sprocket wheels and a chain 29 extending to a horizontal shaft 30. The latter shaft is driven by connection with an electric motor 31 through suitable speed reducing gears in a casing 32. This motor and the associated drive mechanism and upper end of the elevator frame are supported on a floor or platform 33 having a rectangular opening 33a permitting the passage of the carriers 14. To operatively connect loading and delivery mechanism with the motor 31, a horizontal shaft 34 is connected to the motor 31 through gearing in the casing 32 and is arranged to drive a vertical shaft 35 through beveled gears 36.

Despatching and receiving stations are located on each of floors A, B and C, said floors having openings, similar to the openings 33a, permitting the passage of the conveyer therethrough. The despatching stations are indicated generally by the numerals 37 at each floor and the receiving stations are indicated by the numerals 38, the former being disposed adjacent to the upwardly moving reach of the chain 11 and the latter adjacent to the downwardly moving reach, as indicated by the arrows in Fig. 1.

*Despatching stations*

At each despatching station there is a pair of rails 39 sloping toward the main conveyer, said rails having mounted thereon a multiplicity of anti-friction wheels 40 for supporting the load or box 25. Mounted centrally between the rails 39 is a tiltable switch support 41 having at one end a small roller 42 to be actuated by a box 25 on the loading station. A mercoid switch 43 is arranged on the support 41 to be closed when the support is tilted by a box 25 on the station. Sides 44 guide the boxes in their passage toward the main conveyer.

Mechanism for loading the carriers is associated with each of the despatching stations. These mechanisms, which are duplicated at the floors A, B and C, each have a pair of parallel arms 45 carrying anti-friction wheels 46. The arms 45 are rigidly secured to a casting 47 having a long hub portion 48 fixed on a horizontal shaft so that the arms 45 are arranged to tilt about the axis of the shaft 49 from an elevated position, like that shown in full lines in Fig. 8, to an operative or extended position like the dotted line position shown in Fig. 8. In the latter position the arms are arranged to form a continuation of the despatching station and to support a load in the path of the carriers, the arms 26 of the carriers being arranged to pass between the arms 45 of the loading mechanism. To stop the arms 45 in their extended position, suitable stop screws 50 are provided on an angular frame member 51 connecting upright frame members 52.

At one end, the shaft 49 projects and has rigidly secured thereto a pinion 53. This pinion meshes with a gear segment 54 supported on a pivot shaft 55 which has bearings in the frame members 52. An arm 56 is integral with the segment 54 and carries an anti-friction roller 57 for engagement with a cam 58 secured to a driven shaft 59. The shaft 59 has bearings in the frame members 52 and has fast on one end a worm wheel 60 arranged to be rotated by a worm 61 fixed on the vertical shaft 35.

Slidable longitudinally in perforations in the frame members 52 is a horizontal rod 62 for locking the gear segment 54 in inoperative position. The rod 62 is normally urged toward the segment 54 by a spring 63 coiled on said rod and confined between one of the frame members 52 and a cross pin on the rod. The gear segment 54 has a perforation or recess 64 therein to receive an end of the rod 62 as best shown in Fig. 6. Electrically actuated means are provided for withdrawing the rod 62 from engagement with the gear segment 54. This mechanism comprises a solenoid 65 having a plunger 66 and a lever 67 connecting said plunger to the rod 62, a pivotal support 68 for the lever 67 being mounted on one of the frame members 52 and the solenoid 65 being supported on a bracket 69.

*Receiving stations*

The receiving stations 38 are in all respects similar to the despatching stations, except that the rails 70 for the former slope away from the main conveyor instead of toward it and there are no switches, corresponding to the switch 43 with its support, for the receiving stations. A delivery mechanism associated with each receiving station 38 is similar to the loading mechanism hereinbefore described in all respects, except that the arms 71 are arranged, when extended, to slope away from the main conveyer to thereby deliver the loads or boxes 25 to the associated receiving stations under the influence of gravity. For each delivery mechanism there is a solenoid 73, similar to the solenoid 65 for the loading mechanism, and a continuously rotating cam 74 fixed on the shaft 59 for the adjacent loading mechanism.

*Timing mechanism*

The structure of my improved timing mechanism is best shown in Figs. 1 to 4 inclusive. The timer is driven by a chain 75 at a speed proportional to the speed of the main conveyer, said chain being driven by a sprocket wheel on shaft 30 and being trained on a sprocket wheel 76 fixed on a horizontal shaft 77. The latter shaft has suitable bearings 78 supported on a top frame member 79 and secured to said shaft between the bearings 78 is a worm 80 for driving a worm wheel 81 secured to the upper end of a vertical shaft 82. At its upper end the shaft 82 has a bearing in the frame member 79 and at its lower end a base 83. The top frame member 79 and base 83 are both circular and both are formed with peripheral, up-standing flanges 84 which have a series of tapped holes 85 therein to receive cap screws 86 for securing vertical frame members 87 to said top and base frame members.

Fixed on the shaft 82 are wheels 88 and 89, each carrying, near its periphery, a series of vertically movable pins 90. A number of the disks 88, 89 are provided on the shaft 82 equal to the number of receiving stations having electrically controlled delivery mechanisms. A number of the pins 90 on each wheel 88, 89 are provided equal to the number of carriers secured to the main conveyer and the spacing of these pins is proportional to the spacing of the carriers on the conveyer. Where, as is usually the case, the carriers are spaced equal distances apart along the main conveyer, the pins 90 are similarly spaced around the wheels 88 and 89.

Each pin 90 is slidable in a vertical socket and may be caused to project above or below the wheel upon which it is mounted. An annular recess in the pin is arranged to be engaged by a spring-pressed ball 91 to frictionally retain the pin in elevated position. Mounted near the lower end of each pin 90 is a disk 92 having a periphery of electric conducting material which is insulated from the shaft of the pin, as best shown in Fig. 5. Associated with each of the wheels 88 and 89 is a single pair of resilient contacts or brushes 93 adapted to be electrically connected by one of the disks 92 when the latter disk is extended downward, to operative position. Each pair of brushes 93 is adapted to constitute the terminals of an electric circuit and is mounted on a bracket 94 secured to one of the frame members 87. Each bracket 94 has projecting therefrom a stationary cam or ramp 95 adapted to engage the lower ends of the pins 90 and to elevate or return them to inoperative position after completion of the circuits hereinafter described.

Associated with the wheel 88 and spaced apart adjacent to the periphery thereof are solenoids 96 and 97 and similarly associated with the wheel 89 are solenoids 98 and 99 (Figs. 3, 4 and 10). The structure of the several solenoids 96, 97, 98 and 99 is identical and the solenoid 96 is located directly beneath the solenoid 98 shown in Fig. 3. These solenoids numbered 96 to 99 inclusive are supported on brackets projecting from the vertical frame members 87 and each solenoid has a plunger 100 extending downward therefrom and arranged to actuate a lever 101 pivotally supported on a pin 102. Rigid arms 103 support the pins 102 and short links 104 connect the plungers 100 to the levers 101. Each lever 101 has a pair of fingers 105 to engage the heads of the pins 90.

*Electric circuits*

As shown in the wiring diagram (Fig. 10) the solenoids 96, 97, 98 and 99 are severally in circuit with manually operable switches 106, 107, 108 and 109. These and certain other switches and the solenoids 65 associated with the despatching stations at the floors A, B and C are severally enclosed within dotted rectangles numbered 110, 111 and 112 respectively. Current supply wires are indicated by the numerals 113 and 114. From the wire 113 a wire 115 extends to the solenoid 96 and the circuit continues from said solenoid by a wire 116 to the switch 106. From the switch 106 at floor A a wire 117 connects with a branch circuit wire 118 extending to the solenoid 65. From said solenoid another wire 119 connects with the current supply wire 113. The switch 108 controls a branch circuit including wires 120 and 121, solenoid 98 and wire 122 connected with the current supply wire 113. The three branch circuits above described are completed through a circuit including a normally open switch 123, a normally closed switch 124, one of the mercoid switches 43 and a wire 125 connected to the current supply wire 114.

The circuits to be controlled from floor B include a wire 126 connected to the supply 114 and extending to the mercoid switch 43, a closed switch 124, an open switch 123 and branch circuit wires 127 and 128, extending respectively to a solenoid 65 and switch 109. The wire 119 completes the branch for the solenoid 65 and the other branch includes the switch 109, a wire 129, solenoid 99 and wire 130 connected to the current supply wire 113.

In a similar arrangement of circuits to be controlled from floor C a wire 131 connects with the supply wire 114 and extends to one of the mercoid switches 43 which is in series with a closed switch 124, an open switch 123 and branch circuits including, as one branch, wire 132, solenoid 65 and wires 133 and 119, and as the other branch, wires 134, switch 107, wire 135, solenoid 97 and wire 136.

In Fig. 10 the circuits particularly associated with the delivery mechanisms for floors B and C are indicated respectively in dotted rectangles 137 and 138. Current supply wires 139 and 140 have branches forming parallel circuits each including the solenoids 73 and each branch also including a pair of the brushes 93. One of these branch circuits is completed through the solenoid 73 at floor B under control of the switch pins 90 on wheel 88 and the other branch includes the solenoid 73 at floor C under control of the pins 90 on wheel 89.

As shown in Figs 7 and 8, a pair of the switches 123 and 124 are located near each loading station. The switch 123 has a movable arm 141 and is fastened to the conveyer frame in such position that the arm 141 projects in the path of pins 142 fixed on the carriers so that upon the approach of each carrier to a despatching station the switch 123 associated with that station is closed. Each of the normally closed switches 124 has an arm 143 projecting in such position as to be actuated by a loaded box 25 on a carrier in the event that the carrier approaching the despatching station has previously been loaded. Movement of the arm 143 by a load on the carrier causes the switch 124 to be opened during the period when the associated switch 123 is closed by the same carrier. In this manner the presence or absence of a load on a carrier approaching the despatching station is detected and the loading mechanism is rendered inoperative if such carrier has a load.

*Structural features*

I prefer to provide for the unloading of any carrier, which has not previously been unloaded, at a terminal station such as that at floor A. To this end no electric control is provided for the unloading arms 71a (Fig. 1) and said arms are fixed in their extended or operative position and no electric switches, timer wheel and circuits are shown for controlling the sending of loads from any despatching station to the receiving station at floor A. I have also assumed, in the illustrated system, that there is no need for means for despatching loads from any floor to the receiving station on the same floor.

The timer wheel 88 is associated with the delivery mechanism for floor B so as to control said mechanism through the solenoid 73 at that floor and the timer wheel 89 is similarly associated with the delivery mechanism for floor C. Where the unloading arms 71a at floor A are fixed, as above indicated, there is no timer control for delivery mechanism at that floor.

As indicated in the wiring diagram, there are manually operable switches 106, 107, 108 and 109 each in circuit with one of the solenoids 96, 97, 98 or 99 and the number of such solenoids provided for each timer wheel is equal to the number of despatching stations from which loads are to be sent to the receiving station associated with the same timer wheel. The several solenoids are spaced around the periphery of a timer wheel from the brushes 93 associated with the same wheel, distances proportional to the distance along the main conveyer between the corresponding despatching and receiving stations. For example, the solenoid 96 is spaced from the brushes 93 associated with the wheel 88 an angular distance which is directly proportional to the distance between the loading mechanism (specifically switch 123) for floor A and the unloading mechanism for floor B, the latter distance being measured along the conveyer chain 11 in the direction of the movement of the chain from the despatching station to the delivery mechanism. Similarly the solenoid 97 is spaced from the brushes 93 for the wheel 88 a distance proportional to the distance along the chain between the loading mechanism for floor C and the delivery mechanism for floor B with which the wheel 88 is associated.

*Operation*

In the operation of the system, assuming that a load or box 25 is to be sent from floor B to floor C, switch 109 at floor B is closed and said box is placed on the antifriction wheels 40 so as to actuate the switch 43 at floor B to closed position. When this is done the arms 45 at floor B are normally elevated, as indicated in Fig. 8, being held in that inoperative position by the locking rod 62. The switch 124 being normally closed, upon the approach of an empty carrier 14 to the despatching station at floor B, the arm 141 of the switch 123 is actuated to close said switch and thereby complete the circuit through the solenoid 65 at that despatching station and also to complete the circuit through the solenoid 99 associated with the timer wheel 89 so that both of said solenoids are energized. The solenoid 65 actuates the rod 62 to permit movement of the arms 45 to the operative position shown in dotted lines in Fig. 8. The fall of said arms by gravity is controlled by the cam 58 which engages the roller 57 on the arm 56, said arm being integral with the segment 54 meshing with the pinion 53 on shaft 49. As the arms 45 reach their lowered position, the box 25 passes upon the rollers 46 into the path of the carrier which thereupon picks up the box and conveys it upward. While this operation takes place at the despatching station for floor B, the energized solenoid 99 causes the fingers 105 on the lever 101 to actuate one of the pins 90 downward. It will be understood that the timer wheels 88 and 89 are continuously rotated and that the wheel 89, rotating in the direction indicated by the arrows in Figs. 3 and 4, presents a pin 90 beneath the fingers 105 at the moment solenoid 99 is energized. Thereafter, upon arrival of the pin 90 (which has been moved downward to operative position) between the brushes 93 the conveyer chain will have moved the loaded carrier from the despatching station at floor B to the top of the elevator shaft and then down along the descending reach to a position a short distance above the delivery mechanism 38 on floor C. At this moment the disk 92 carried by pin 90 closes the circuit through the solenoid 73 controlling the delivery mechanism at floor C so that the locking rod 62 is actuated to release the arms 71. These arms fall immediately to the operative position shown in Fig. 6 under control of the cam 74 for the delivery mechanism at floor C. This operation takes place just before the carrier 14 with its load or box 25 reaches the arms 71 so that continued movement of the conveyer carries the box to be deposited upon the arms 71. Finally the box passes by gravity away from the main conveyer upon the anti-friction wheels carried by arms 71 and rails 70.

In a manner which will be evident from the foregoing description, loads may be sent from the despatching station at floor A to the receiving stations at floors B and C under control of the switches 106 and 108, one of said switches being opened when the other is closed. A load may also be sent from floor C to floor B under control of the switch 107. When a load is to be sent from either floor B or floor C to floor A, the box 25 is placed on the appropriate despatching station and with the switches 107 or 109, as the case may be, open the next empty carrier picks up the box and transports it to the fixed unloading arms 71a at floor A.

It is to be understood that the foregoing is merely descriptive of one form of my invention and that many modifications in the construction and arrangement of the conveyer and number and arrangement of despatching and receiving stations may be made within the scope of the appended claims.

Having described my invention, what I claim as new and desire to protect by Letters Patent is:

1. The combination with a conveyer having carriers, of a despatching station, a plurality of receiving stations, power-actuated loading mechanism at said despatching station for loading said carriers, an electric control magnet for each of said receiving stations and for said loading mechanism, manually operable switches at said despatching station for selecting the place of delivery, a carrier switch operable upon the approach of a carrier to said despatching station, a loading switch operable by a load on said loading mechanism, an electric circuit including said control magnet for said loading mechanism and said carrier and loading switches, and a timer under control of said manually operable switches for actuating said control magnets for the receiving stations comprising a series of switch elements movable in timed relation to the conveyer and circuits severally including said control magnets and each under control of one of said movable switch elements.

2. The combination with a conveyer having carriers, of a despatching station, a plurality of receiving stations, power-actuated loading mechanism at said despatching station for loading said carriers, an electric control magnet for each of said receiving stations and for said loading mechanism, manually operable switches at said despatching station for selecting the place of delivery, a carrier switch operable upon the approach of a carrier to said despatching station, a loading switch operable by a load on said loading mechanism, an electric circuit including said control magnet for said loading mechanism and said carrier and loading switches, and a timer under control of said manually operable switches for actuating said control magnets for the receiving stations comprising a series of switch supports movable in timed relation to the conveyer, movable switch elements mounted on each of said supports, electro-magnetic devices for rendering said elements operative, branches of said first-mentioned circuits including said manually operable switches and electro-magnetic devices and circuits severally including said control magnets and each under control of said movable switch elements carried by one of said supports.

3. The combination with a conveyer having a series of carriers, of a despatching station, a plurality of receiving stations, power-actuated loading mechanism at said despatching station for loading said carriers, an electric control magnet for each of said receiving stations and for said loading mechanism, manually operable switches at said despatching station for selecting the place of delivery, a carrier switch operable upon the approach of a carrier to said despatching station, a loading switch operable by a load on said loading mechanism, an electric circuit including said control magnet for said loading mechanism and said carrier and loading switches, and a timer under control of said manually operable switches for actuating said control magnets for the receiving stations comprising a plurality of wheels revoluble in timed relation to the conveyer, a number of switch elements equal to the number of carriers spaced on each of said wheels in accordance with the spacing of the carriers on the conveyer, and circuits severally including said control magnets and each under control of the said switch elements on one of said wheels.

4. The combination with a conveyer having a series of spaced carriers, of a despatching station where said carriers are to be loaded, a plurality of receiving stations spaced along said conveyer at various distances from said despatching station, and means for selecting the receiving station to which a load is to be delivered comprising, a series of movable supports for switch elements, means for actuating said supports in unison with said conveyer, one of said supports being provided for each of said receiving stations, a switch contact mounted adjacent to the path of each of said movable supports, a number of movable switch elements equal to the number of carriers on said conveyer mounted on each of said supports and spaced apart thereon according to the spacing of the carriers, said elements being adapted when in operative position, to actuate said switch contacts, an electromagnetic device associated with each of said movable supports for actuating said elements to operative position and each of said devices being spaced from one of said switch contacts along the path of the associated support a distance proportional to the distance along the conveyer from said despatching station to a receiving station, an electric actuating magnet for each of said receiving stations, a manually operable switch at said despatching station for each of said electric actuating magnets, electric circuits severally under control of said switches and severally including said electro-magnetic devices and electric circuits severally under control of said contacts and elements and including said electric actuating magnets.

5. The combination with a conveyer having a series of spaced carriers, of a plurality of despatching stations, a plurality of receiving stations spaced along said conveyer at various distances from said despatching stations, and means for selecting the receiving station to which a load is to be delivered comprising, a series of movable supports for switch elements, means for actuating said supports in unison with said conveyer, one of said supports being provided for each of said receiving stations, a switch contact mounted adjacent to the path of each of said movable supports, a number of movable switch elements equal to the number of carriers on the conveyer mounted on each of said supports and spaced apart according to the spacing of said carriers, said elements being adapted, when in operative position to actuate said switch contacts, electro-magnetic devices for actuating said elements to operative position, a number of said last mentioned devices equal to the number of despatching stations less one being provided for each of said movable supports and each of said devices being spaced from one of said switch contacts along the path of the associated support a distance proportional to the distance along the conveyer from a despatching station to a receiving station, an electric actuating magnet for each of said receiving stations, a manually operable switch at each of said despatching stations for each of said electric actuating magnets, electric circuits severally under control of said switches and severally including said electro-magnetic devices for actuating said devices and electric circuits severally under control of said contacts and elements and including said electric actuating magnets.

6. The combination with an endless conveyer having a series of carriers secured thereto, of despatching and receiving stations spaced along said conveyer, delivery mechanism associated with said receiving station, a traveling support for switch elements operatively connected to said conveyer, switch elements movably mounted on said support, one of said elements being provided on said support for each of said carriers and said elements being spaced on said support according to the spacing of the carriers on said conveyer, means for actuating said elements to inoperative position, control means arranged to be actuated by said elements when the latter are in operative position, means operable by said control means for rendering said delivery mechanism operative, manually operable means at said despatching station and means under control of said manually operable means for actuating said elements to operative position.

7. The combination with a conveyer having a series of carriers secured thereto, of despatching and receiving stations disposed along said conveyer, delivery mechanism associated with said receiving stations, traveling supports for switch elements operatively connected to said conveyer, one of said supports being provided for each of said delivery mechanisms, switch elements movably mounted on said supports, one of said elements being provided on each support for each of said carriers and said elements being spaced on said supports according to the spacing of the carriers on said conveyer, means for actuating said elements to inoperative position, control means arranged adjacent to each of said supports to be actuated by said elements when the latter are in operative position, means under control of said control means for respectively rendering said delivery mechanisms operative, manually operable means at said despatching stations and means under control of said manually operable means for actuating said elements to operative position.

8. The combination with a conveyer having a series of carriers secured thereto, of despatching and receiving stations disposed along said conveyer, delivery mechanisms associated with said receiving stations, a timer shaft operatively connected to said conveyer, wheels fixed on said shaft, one for each of said delivery mechanism, switch elements movably mounted on said wheels, one of said elements being provided on each wheel for each of said carriers and said elements being spaced on said wheels according to the spacing of the carriers on said conveyer, means for actuating said elements to inoperative position, control means arranged adjacent to each of said wheels to be actuated by said elements when the latter are in operative position, means under control of said control means for respectively rendering said delivery mechanisms operative, manually operable means at said despatching stations and means under control of said manually operable means for actuating said elements to operative position.

9. The combination with an endless conveyer having a series of carriers secured thereto, of despatching and receiving stations disposed along said conveyer, delivery mechanisms associated with said receiving stations, a timer shaft operatively connected to said conveyer, wheels fixed on said shaft, one for each of said delivery mechanisms, switch elements movably mounted on said wheels, one of said elements being provided on each wheel for each of said carriers, said elements being spaced on said wheels according to the spacing of the carriers on said conveyer, means for actuating said elements to inoperative position, electro-magnetic devices for actuating said elements to operative position disposed adjacent to each of said wheels, control means arranged adjacent to each of said wheels to be actuated by said elements when the latter are in operative position, means under control of said control means for respectively actuating said delivery mechanisms, manually operable switches at said despatching stations and electric circuits under control of said switches and including said electro-magnetic devices for actuating said switch elements to operative position.

10. The combination with a conveyer having a series of carriers, of despatching and receiving stations disposed along said conveyer, delivery mechanisms at said receiving stations, a timer shaft operatively connected to said conveyer, wheels fixed on said shaft, one for each of said delivery mechanisms, switch pins movably mounted on said wheels, one of said pins being provided on each wheel for each of said carriers and said pins being spaced on said wheels according to the spacing of the carriers on said conveyer, means for actuating said pins to inoperative position, electro-magnetic devices for actuating said pins to operative position, said devices being mounted adjacent to said wheels, switch contacts arranged to be rendered operative by said pins when the latter are in operative position, each of said contacts being spaced from one of said electro-magnetic devices a distance, around the periphery of one of said wheels, proportional to the distance along said conveyer of a receiving station from a despatching station, circuits, including said contacts respectively, for actuating said delivery mechanisms, manually operable switches at said despatching stations and electric circuits under control of said switches and including said electro-magnetic devices for actuating said pins.

WILLIAM T. DONALDSON.